(12) United States Patent
Malitski

(10) Patent No.: US 8,244,645 B2
(45) Date of Patent: Aug. 14, 2012

(54) METHOD FOR SHIPMENT PLANNING/SCHEDULING

(75) Inventor: Konstantin N. Malitski, Bad Schonborn (DE)

(73) Assignee: SAP Aktiengesellschaft, Walldorf (DE)

( * ) Notice: Subject to any disclaimer, the term of this patent is extended or adjusted under 35 U.S.C. 154(b) by 2183 days.

(21) Appl. No.: 11/212,317

(22) Filed: Aug. 25, 2005

(65) Prior Publication Data

US 2007/0050195 A1 Mar. 1, 2007

(51) Int. Cl.
*G06Q 30/00* (2006.01)
(52) U.S. Cl. ............................. 705/330; 705/342; 705/1.1
(58) Field of Classification Search .................. 705/1, 7, 705/8, 29, 400, 500, 26–27.2, 330, 342
See application file for complete search history.

(56) References Cited

U.S. PATENT DOCUMENTS

2002/0019759 A1* 2/2002 Arunapuram et al. ............ 705/7

OTHER PUBLICATIONS

Wikipedia, "Microsoft Access," May 7, 2010; Wikimedia Foundation, Inc., http://en.wikipedia.org/w/index.php?title=Microsoft_Access&printable=yes.*

* cited by examiner

*Primary Examiner* — Adam Levine
(74) *Attorney, Agent, or Firm* — Blakely, Sokoloff, Taylor & Zafman LLP

(57) ABSTRACT

A new model for transportation planning vehicle scheduling (TPVS). A database table for shipment documents independent of an order for goods, e.g., a sales order is created. When an order for goods is received, the database table is populated with a shipment document corresponding to, but independent of, the order for goods. This shipment document is owned by the TPVS system.

11 Claims, 11 Drawing Sheets

# METHOD FOR SHIPMENT PLANNING/SCHEDULING

BACKGROUND OF THE INVENTION

1. Field

Embodiments of the invention related to transportation planning vehicle scheduling. More specifically, embodiments of the invention relate to a new model of shipments used in a transportation planning vehicle scheduling system.

2. Background

Existing transportation planning/vehicle scheduling (TPVS) systems, such as those available from SAP AG of Walldorf, Germany, store shipment activities within the data structure of corresponding planned orders. FIG. 1A is a diagram of a prior art data structure. The sales order data structure 102, which may alternatively be referred to as a sales order document, includes shipment information 104 and more particularly shipment activities 106, which may include such things as loading, unloading, transport, empty legs, breaks, etc. Since shipment activities are retained within the sales order data structure 102, it is not possible for a TPVS shipment to exist without an original order.

FIG. 1B is a diagram of a transportation plan. FIG. 1B illustrates activities of the transportation plan stored within each sales order. Start activity 120 and end activity 122 are basically housekeeping activities for a TPVS system. In this model, load activities are designated with an L, transport activities with a T, break activities with a B, and unload activites with a U. As shown in dotted lines, this model includes significant redundant data as a same transport activity 130 is replicated as transport activities 132 and 133 respectively in data structures corresponding to the second and third sales orders that are planned as part of the transportation plan. Similarly, the break activities are a little more than a place holder within the transportation plan, but still require data stored within the sales orders. This redundant data tends to negatively influence performance as very large data sets become involved with increasing size of the supply chain.

Additionally, any change to one of the orders will result in deletion of shipment activities and could result in invalidation of the transportation plan. Instability of the transportation plan negatively impacts performance and reliability and is a significant issue in TPVS. Additionally, splitting shipment quantities for transportation is difficult or impossible because a TPVS system would need to split the sales order itself. In existing supply chain management systems, TPVS systems typically have insufficient rights to the sales order document to permit such a split. This can lead to inefficient vehicle usage.

SUMMARY OF THE INVENTION

A new model for transportation planning vehicle scheduling (TPVS) is disclosed. A database table for shipment documents independent of an order for goods, e.g., a sales order is created. When an order for goods is received, the database table is populated with a shipment document corresponding to, but independent of, the order for goods document. This shipment document is owned by the TPVS system.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 2A:
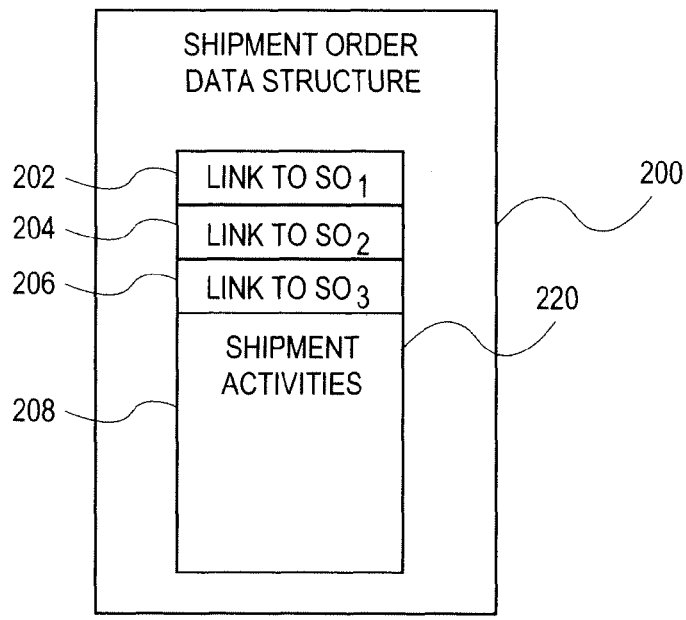
FIG. 2A is a diagram of a shipment order data structure according to one embodiment of the invention.

FIG. 2A is a diagram of a shipment order data structure according to one embodiment of the invention. Shipment order data structure 200 includes links to sales orders that correspond to goods to be shipped. For example, links 202, 204 and 206 to $SO_1$, $SO_2$, and $SO_3$ respectively. Also within shipment order data structure 200 are shipment activities that correspond to a shipment of the goods specified in the linked sales orders. In this model, the storage of shipment activities is removed from the sales order document and instead occurs in the shipment order document. While the shipment order data structure includes links to sales orders, it is independent of the sales orders themselves. Moreover, the shipment orders are owned entirely by transportation planning vehicles scheduling (TPVS) system which permits alteration of the shipments by TPVS and creation of shipments independent of any preexisting original order. Moreover, in one embodiment, no other entity is permitted to change shipment orders. This improves flexibility of the TPVS system to provide functionality such as order split, examples of which are described below.

Figure 1A:
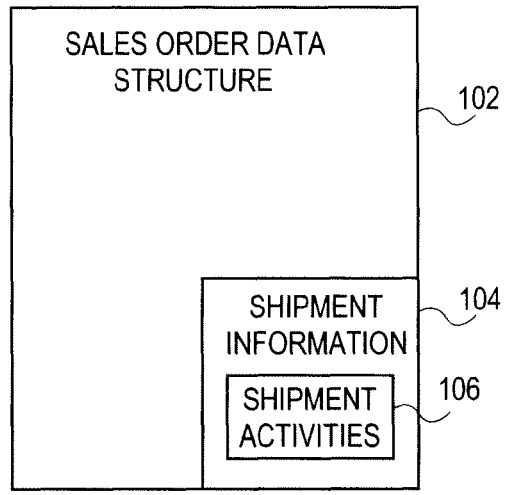
FIG. 1A is a diagram of a prior art data structure.
Figure 1B:
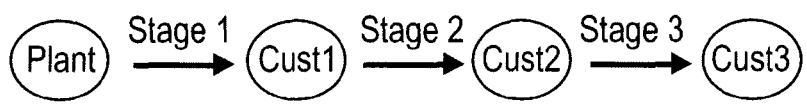
FIG. 1B is a diagram of a transportation plan.
Figure 1B:
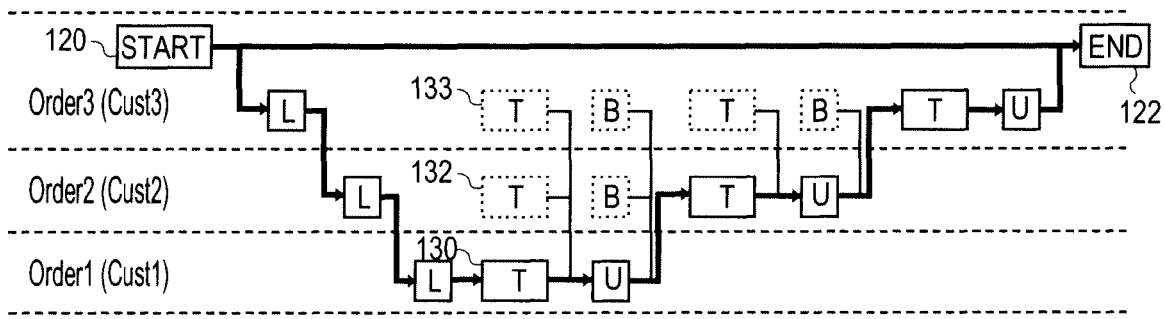
Figure 2B:
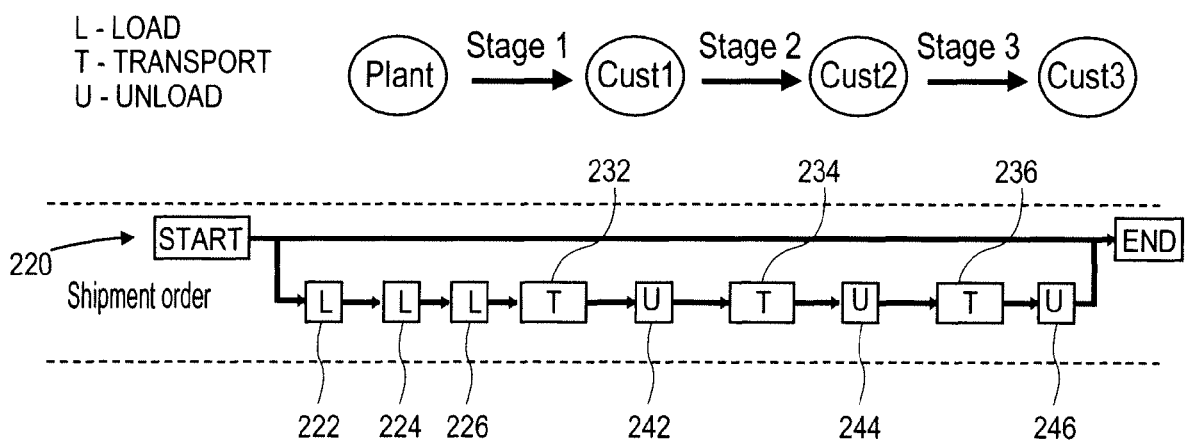
FIG. 2B is a diagram of a shipment order corresponding to FIG. 1B.

FIG. 2B is a diagram of a shipment order corresponding to FIG. 1B. Because the activity data is stored in a common document rather than the individual corresponding sales orders, the redundant activities are eliminated. This reduces memory usage and enhances performance. Shipment order 220 includes the start and end activities that constitute housekeeping activities of the scheduling engine and includes one load activity 222, 224, 226, one transport activity 232, 234, 236 and one unload activity 242, 244, 246 for each of the first, second and third customers respectively. Reduced redundancy and ownership of the shipment order by the TPVS system improves performance and permits a significantly more stable transportation plan in light of possible changes in the orders for goods.

Figure 3:
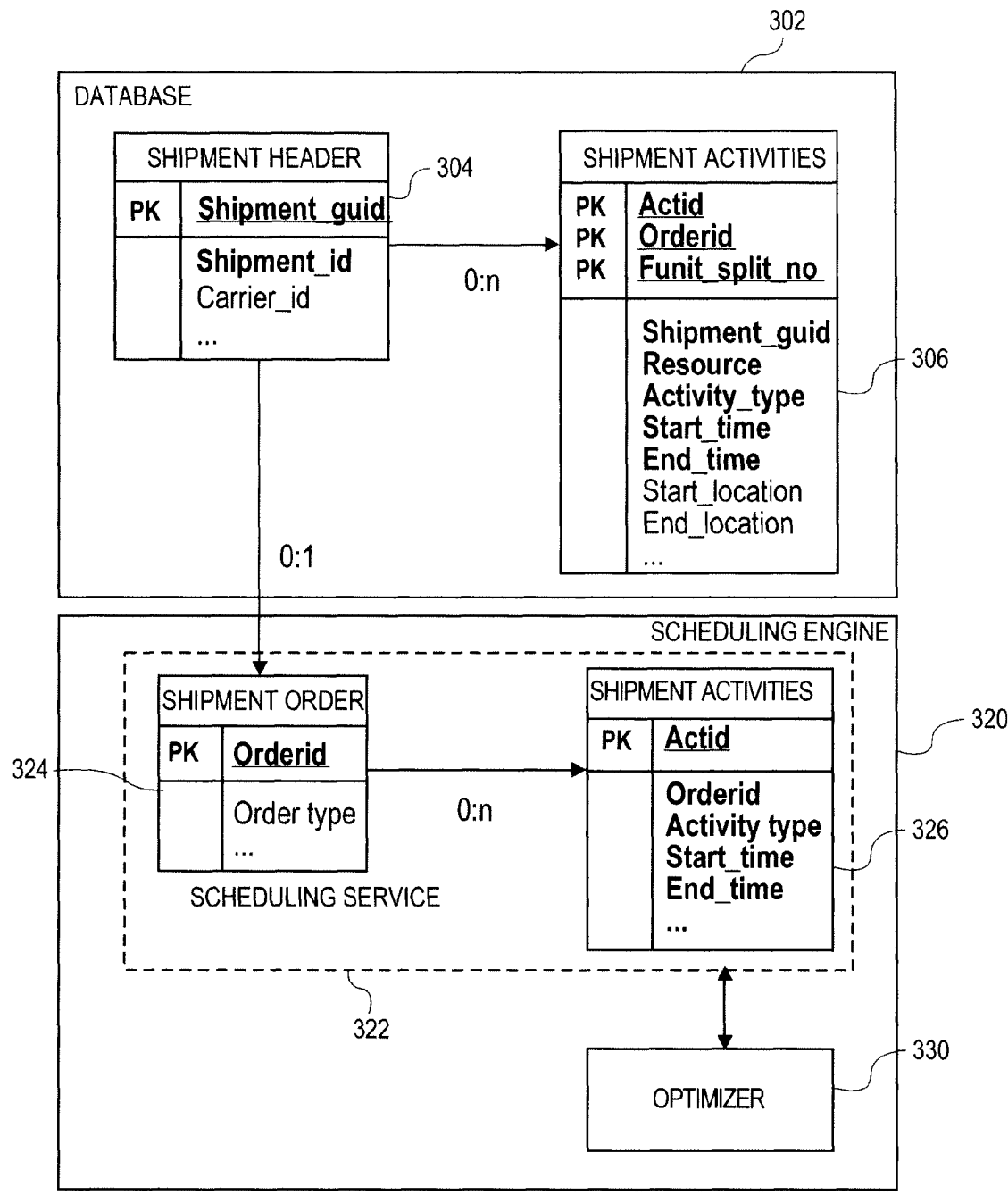
FIG. 3 is a data relationship diagram of one embodiment of the invention.

FIG. 3 is a data relationship diagram of one embodiment of the invention. A persistent storage unit such as database 302 includes a database table 304 which persistently holds data representing a planned shipment. Each shipment is associated with a shipment global unique identifier (GUID) which is linked to the database table 306 of shipment activities. In one embodiment, shipment activities database table 306 includes an activity ID (ACT ID) which provides a linkage between sales order and activities. An order ID is included to provide a linkage between a sales order and a shipment. A freight unit (FU) split number (FUNIT split no) to facilitate sales order splits as explained in more detail below may also be included. An activity includes such parameters as resource, activity type, start time, end time, start location, and end location. Resource may, for example, be the type of transport vehicle. Activity type is previously noted may be, for example, load, transport, unload, empty leg, etc. Start time, end time and start location and end location are self-explanatory.

In one embodiment, the shipment activities are replicated to a scheduling engine 320 at shipment activities data structure 326, which may reside in a volatile memory. Scheduling service 322 in scheduling engine 320 associates the shipment order data structure 324 based on the order ID corresponding to a single shipment order with the shipment activities for that order. Scheduling service 322 may use an optimizer 330 to optimize shipment of the various goods based on the existing resources. In one embodiment, scheduling engine 320 is live-Cache available from SAP AG of Walldorf, Germany. In one embodiment, the system is implemented as part of an advanced planner optimizer (APO) software system for use in a multitude of business planning applications.

In some embodiments, the scheduling service 322 may not be used and the shipment may be created using only the optimizer 330 (which may have some scheduling functionality) based on the shipment data in the database 302. In such an embodiment, it is not necessary to replicate activity data to the scheduling engine as the optimizer may use the data directly from the database 302. The created shipments are aggregated into a transportation plan.

Figure 4:
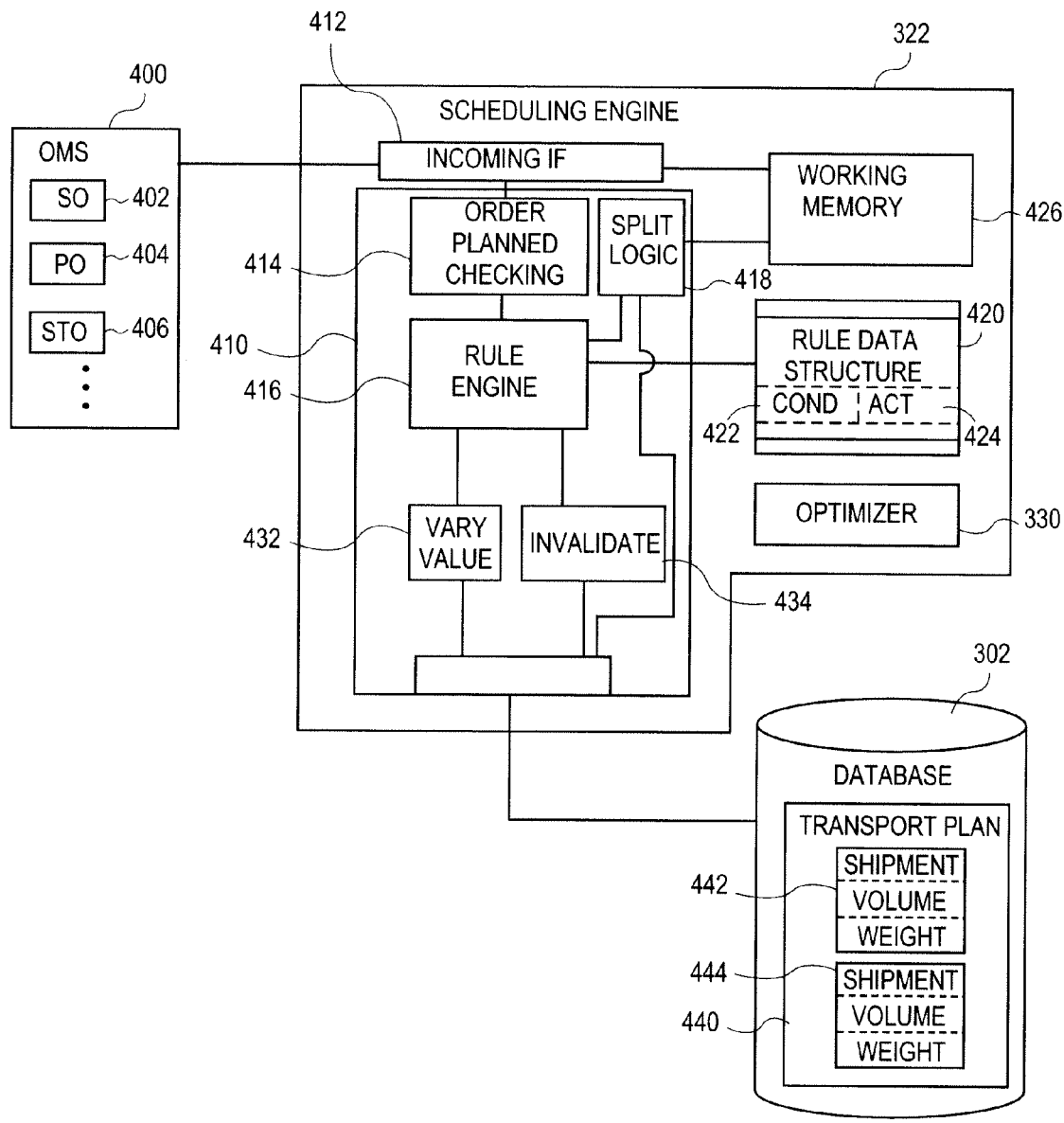
FIG. 4 is a block diagram of a system of one embodiment of the invention.

FIG. 4 is a block diagram of a system of one embodiment of the invention. An order management system (OMS) 400 may provide orders for goods, such as sales orders, purchase orders, stock transfer orders, etc. to scheduling engine 322. For convenience, discussion herein will primarily refer to sales orders, however, it should be understood that the discussion is equally applicable other types of orders for the acquisition or transfer of goods. The TPVS system uses data from the various documents that may be provided by the OMS 400 as sources for transportation requirements such as, without limitation, capacities to ship order to customer from supplier, necessary shipping conditions, time deadlines, quantities, priorities, etc.

A database 302 may contain a transportation plan 440, typically including multiple shipments 442, 444, that may each have an associated volume and/or weight that may be prescribed by a vehicle used for transport. As previously noted, it is desirable to maintain stability of the transportation plan 440. Changes to the orders on which the shipments 442, 444, and thus, the transportation plan 440 are based may be of various practical effects for transportation. For example, order changes relevant for transportation include quantity changes, shipping condition changes, delivery date changes, and material availability changes. Conversely, for example, changes to order text and billing/costing information changes need not have any effect on the transportation plan 440. In some embodiments, rule based control over the transportation plan 440 in the event of order changes is provided.

When an order is received at the incoming interface 412 of scheduling engine 322, it may be stored as a transient object in the working memory 426. A call may then be placed to TPVS inbound processing controller 410 to use planned order logic 414 to check if the incoming order represents a change to an existing planned order, e.g., a previously placed order that is already part of the transportation plan 440. This may be determined by reading the transportation plan 440 from the database 302 and company's orderids within the planned shipments and comparing with the orderids of the incoming change order.

Rule engine 416 may be engaged in the event that order plan checking logic 414 determines that incoming order represents a change to a planned order. Rule engine 416 relies on rules from a rule data structure 420. Each rule includes a condition 422 and an action 424 to be performed in response to evaluation of the condition. In one embodiment each rule is defined by a set of parameters. A "control rule ID and description" parameter uniquely identifies the rule. An "action" parameter defines the action 424 to be performed responsive to detection of an order change having certain characteristics. An "order types" parameter to specify to which order types the rule applies, e.g., sales order, sales order delivery, etc. A "priority" parameter defines the sequence in which the set of rules should be evaluated. The "condition" parameter is evaluated to identify if the action should be performed on the order.

A "change to be processed" parameter identifies the types of changes that may be processed upon satisfaction of the condition. In one embodiment, four possible change types are possible: "change" type changes order or delivery data; "delete" type deletes the order or delivery; "delivery creation" type creates a delivery for the order; and "good's issue" type results in a goods issued delivery for the order. Finally, a "change condition" parameters specifies a condition for new order data that triggers the rules. A change condition specifies a condition to be evaluated on the new order attribute directly or the change (or delta between the old and the new order). This distinction is referred to as direct and relative change conditions respectively. For example, the rule may be triggered when the new quantity is more than 10% different from the previous order quantity. The following examples illustrate the interaction between the condition parameter and the change condition parameter.

EXAMPLE 1

Condition: Order Shipping Conditions='Truck1'.
Change Condition (direct): Order Shipping Conditions='TRUCK2' or 'TRUCK3'.
This combination of condition and change condition specifies that the corresponding rule will be valid only for orders having previous shipping condition 'TRUCK1' and changed to 'TRUCK2' or 'TRUCK3'.

EXAMPLE 2

Condition: Order Shipping Conditions='TRUCK*'.
Change Condition (relative): Order Weight<10% and Order Volume<10%.
This combination of conditions specifies that the corresponding rule will be valid only for orders having previous shipping conditions 'TRUCK*' and for which new weight and volume do not exeed 110% of the prior weight and volume.

In various embodiments, the rules are defined by a subset of the foregoing parameters. In other embodiments, more, fewer or different parameters may be used to define the change rules.

The condition(s) can be established to be arbitrarily complexed. In one embodiment, the condition can make a rule valid or invalid based on characteristics of the order, e.g., priority, shipping conditions, etc. This permits great flexibility in controlling the effect of order changes on the transportation plan. In one embodiment, the conditions permit the validity of a rule to be restricted to a particular set of shipment characteristics, e.g., shipment tendering status, shipment status, carrier, dates, and transportation mode. With this restriction, a planner define different actions for shipments with different status, carrier, etc.

In some embodiments, conditions may define changes permitted without requiring replanning. For example, in one example replanning may be avoided where material availability shifts to an earlier date or where changes in quantity are less than 110% of the old order.

In some embodiments, the possible action 424 includes adjustment of shipment values, invalidation of a shipment and setting of an alert signal. An "adjust shipment" action will maintain existing shipments unchanged if quantities of the order is not changed or vary the quantity of e.g., total weight or volume if the order quantities are changes. In one embodiment, the adjust shipment action has no other effect on the shipment such that it remains relevant for transportation and the transportation plan 440 remains stable. A write alert action writes a specified alert to persistent storage to advise a user that a change has occurred and that review and possible change of the transportation plan 440 may be necessary.

In one embodiment, two varieties of the "invalidate shipment" action are possible: invalidate and keep order and invalidate and unplan. If the order is to be kept, the action sends a cancellation message to the carrier if the shipment has been tendered and gets a status of the shipment to an invalidated state. In this event, the shipment is no longer relevant for transportation, but could be made relevant by resetting the status to a valid state. In this context, the shipment is excluded from the released transporation plan (until its status is reset to valid).If the order is to be unplanned, the action behaves as described above, but also unplans the order from any shipments. The corresponding order, e.g., sales, may be replaned on the same or different shipments.

Multiple rules may be evaluated by rule engine to act on an incoming order change. These rules may be applied in a priority order and may be applied serially in that order by the rule engine 416. Depending on the evaluation of the rules, rule engine may invalidate a shipment as part of the transportation plan using invalidation logic 434. Invalidation logic 434 may simply invalidate the shipment or may also unplan the order from the transportation plan. However, if, for example, rule engine discerns that the incoming order change has an effect below a threshold on the planned shipment, rule engine may trigger an alert or vary a value using variance logic 432 to change a volume or weight of a planned shipment.

In certain contexts, it may be desirable to split an order into more than one shipment. The two dominant such contexts are for large orders splits based on vehicle capacity may be described and splits to achieve optimal load and minimal resource use. For example, a sixty ton order may be split into two thirty ton truck shipments or three twenty ton orders may result in one order split to yield two thirty ton truck shipments. In some embodiments, compatibility rules may precipitate a split of an order. For example, chemical cleaning products may not be compatible for shipment with food stuffs.

In some embodiments, split logic 418 may use working memory 426 to create one or more split freight units (SFUs) and potentially one or more remainder freight unit (RFU) as discussed in more detail below. Working memory 426 is a transient memory and its contents may not be persisted to the database 302. SFUs of a single order may be differentiated with a split number, which in one embodiment is appended to the order number of the single order. In one embodiment, SFUs are transient and do not represent a document. Rather, they represent a simulated current split for transportation planning, e.g., a simulated delivery. If the transportation plan is to be released for execution, each SFU is converted to a delivery. The delivery is then persistedto the database. RFU represents an open quantity of an order calculated as total quantity less total quantity of split freight units. Where incompatible, goods exist in the same order more than one RFU may exist. Split logic 418 may simulate various shipments in working memory 426 prior to persisting a shipment to the database 302.

Split logic 418 may access rule engine 416 to apply a set of split rules in evaluating how freight units should be created from an incoming order. In one embodiment, split rules are defined by a set of parameters. An "identifier" and description "uniquely" identifies the rule. A "manual rule flag" prevents automatic application of the rule such that the rule may only be used during manual split operations. The "condition" parameter specifies the orders in which the split rule may be applied. An "order type" identifies the order types for which the rule is valid.

"Split values" are a set of parameters such as unit of measure, split quantity, rounding quantity and use vehicle capacity that defines valid splits. Here "unit of measure" is used as the split limit, e.g., measures size of a SFU or rounding quantity. "Split quantity" defines the point at which a split will occur, e.g., if order quantity exceeds the split quantity, an SFU is created. "Rounding quantity" defines that freight unit quantities should be product of integer number and rounding quantity. The "use vehicle capacity" parameter causes the split quantity to be taken as the vehicle capacity of the vehicle suitable for transporting the corresponding order.

A "consolidation strategy" parameter defines how items of one order are aggregated into FUs. In one embodiment, three strategies may be employed. "Full consolidation" permits any compatible items of one order to be consolidated as an FU. "Consolidate only entire order" permits consolidation only if the entire order is compatible, and total quantity of order does not exceed imposed limits. Otherwise, FUs are created on a per order item basis. Finally, no consolidation only permits freight units to be created on a per order item basis. A "consolidation planned freight units" parameter causes SFUs from a same order scheduled on a same vehicle to be consolidated as a single SFU. A "no item split" parameter prevents splits of any item the order is only permitted to include fully in a freight unit. A "create new freight unit for remainder" parameter, if set, causes the remaining quantities of an order to be included in a new SFU. This results in the RFU having zero quantity. If not set, the RFU will include the item quantities that are not included in the SFUs.

A "balancing strategy" parameter defines a way items are distributed between different FUs during split. In one embodiment, two balancing strategies are possible. Proposi-tional unweighted balancing causes items to be included in freight units in quantities proportional to the number of items. Proportional weighted balancing causes items to be included in freight units based on the formula (split quantity*weight of item in order)/number of items in order. Examples of the balancing and consolidation strategies are depicted with reference to FIG. 10. It should be recognized that split rules may be defined by a subset of the above parameters. In other embodiments, more, fewer or different parameters may be used to define the split rules.

Split rules may include compatibility rules, optimization rules and split strategy rules. In one embodiment, the split rules minimize splits of initial orders to mitigate the effect of order changes on the transportation plan 440. Notably, the original order from the OMS is not split or otherwise changed, rather the quantities of the order are assigned to FUs (split and remainder) that may be planned as different shipment.

Figure 5:
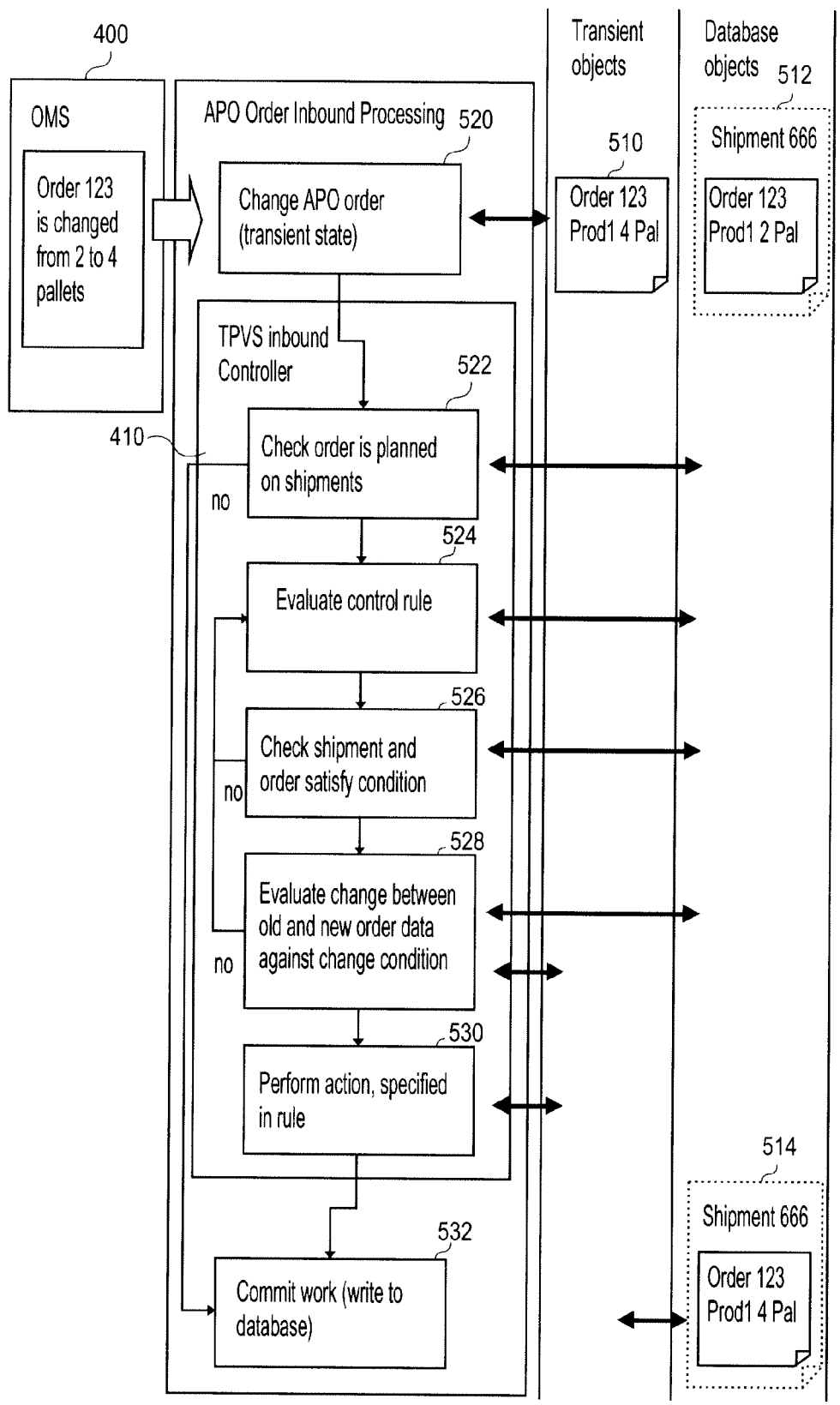
FIG. 5 is a diagram of inbound order processing according to one embodiment of the invention.

FIG. 5 is a diagram of inbound change order processing according to one embodiment of the invention. OMS 400 submits an order 123 which is changed from two pallets to four pallets in this example. Order 123 has already been planned as part of a shipment 666 and is represented by a database object 512. The order change is instantiated as a transient object 510 in working memory at block 520. This transient object 510 is not persisted to the database. In the TPVS inbound controller 410, a determination is made at block 522 if the order is planned on a shipment. In this case, since order 123 has been planned in shipment 666, a highest priority yet to be evaluated control rule is evaluated at block 524.

A determination is made at block 526 if the condition of the control rule is satisfied. If not, the control rule next in priority is evaluated at block 524. If the shipment and order satisfy the condition, an evaluation of the change between the old and new order data against a change condition (in the case of a relative change condition) at block 528. If the change condition is a direct change, condition the new data is evaluated directly against the condition at block 528. If that condition is satisfied, the action specified in the rule is performed. By way of example, it is determined that sufficient room on the scheduled vehicle to add two additional pallets, the adjust quantity action performed at block 530 would create a new transient object for shipment 666 having order 123 and four pallets of product 1. This transient object is then committed to the database at block 532 as persistent object 414. In this manner, order changes can be accommodated with minimal impact on the transportation plan.

Figure 6:
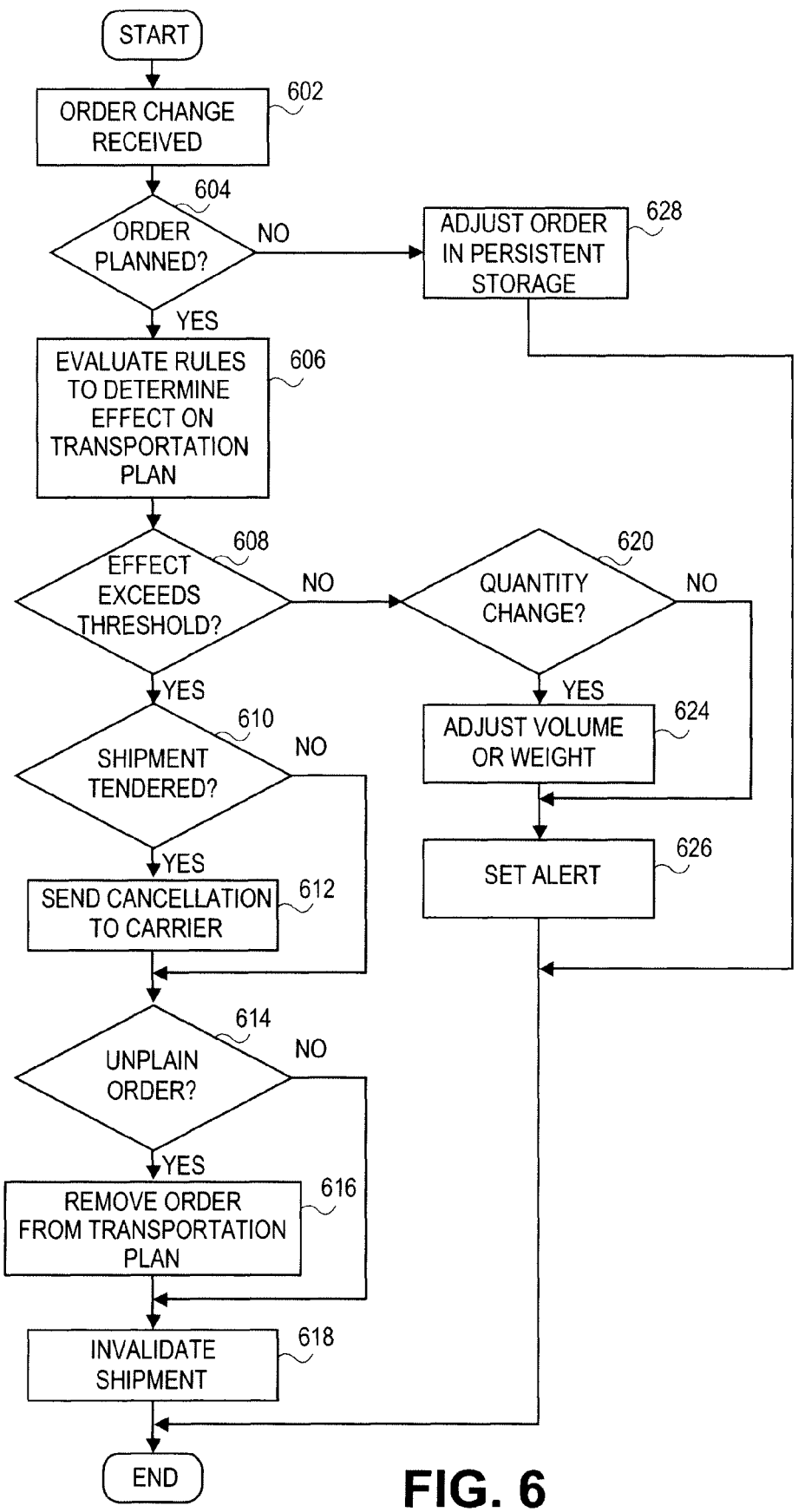
FIG. 6 is a flow diagram of order change in one embodiment of the invention.
Figure 7A:
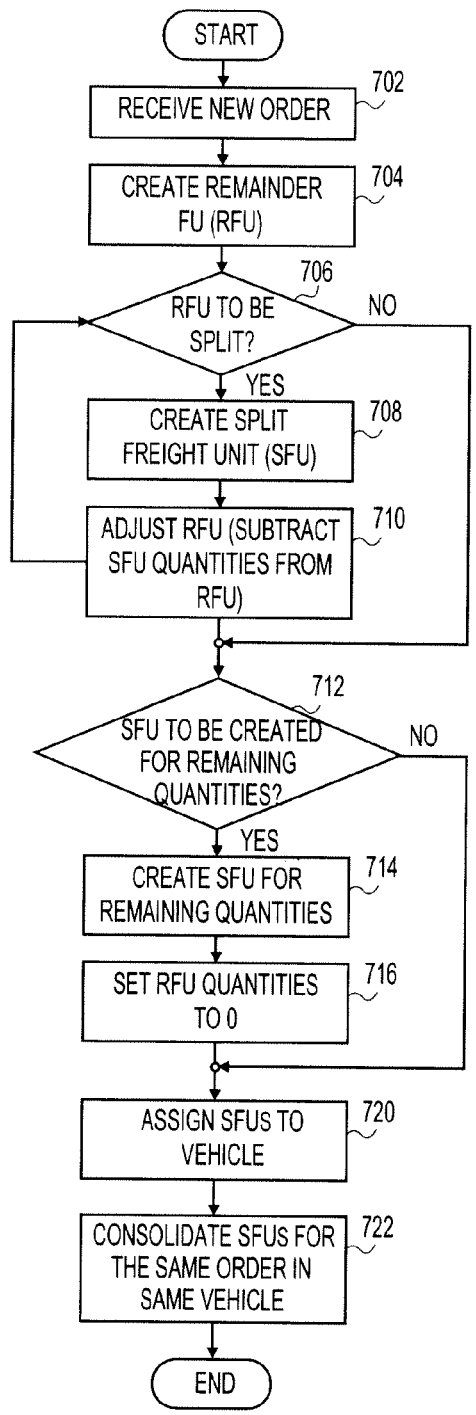
FIGS. 7A & B are flow diagrams of order split in accordance with one embodiment of the invention.

FIG. 6 is a flow diagram of order change in one embodiment of the invention. At block 602, an order change is received. A determination is made at block 604 if the order has been planned. If the order has not already been planned, it is adjusted in persistent store at block 628. If the order has been planned, a set of rules are evaluated to determine the effect on the transportation plan at block 606. The determination is made at block 608 if the effect exceeds a threshold. If it does, a determination is made at block 610 if the shipment has been tendered to a carrier. If the shipment has been tendered to a carrier, cancellation message is sent to the carrier at block 612. If the shipment has not been tendered to the carrier a determination is made at block 614 if it is desired to unplan the order at block 614. If the order should be unplanned, it is removed from the transportation plan at block 616. If it is not desired to unplan the order at block 614, the shipment is invalidated at block 618. If at decision block 608 it is determined that the effect does not exceed a threshold, a determination is made at block 620 if the order change resulted in a quantity change at 620. If a quantity change resulted, the volume or weight or other appropriate quantity is adjusted at block 624. If no quantity changed or after adjustment of the weight, volume, etc., an alert is set at block 626. In some embodiments, sucha s in the APO where the order may be used by systems other than the TPVS, the changes to the order are written to persistent storage after blocks 618 or 626. However, in a pure TPVS context where the changes are not relevant for transportation, persisting the changes are not strictly necessary. FIG. 7a is a flow diagram of order split in accordance with one embodiment of the invention. At block 702 an new order is received. As previously noted, this original order is not changed. At block 704, a remainder freight unit (RFU) is created corresponding to total content of order. In one embodiment, a check 706 is done whether RFU should be split. If so, at least one split freight unit (SFU) is created at block 708, with size equal to either the minimum package size suitable for transportation, or a capacity of a transport vehicle. For example, the SFU may be a carton, a pallet, truck container etc. At block 710 RFU is adjusted, in particular, quantities of the SFUs are substracted from original RFU quantity. The check 706 and blocks 708, 710 is repeated until it is no longer desirable to split the RFU. In some embodiments, compatibility of items is addressed during creation of the FUs. In one embodiment, initially a plurality of RFUs are created each corresponding to a compatibility group. Then each RFU is split into SFUs and possibly one RFU based on transportation constraints. The remainder of the flow is applied individually to each RFU.

At decision block 712, a determination is made whether an SFU should be created for any remaining quantity. In some embodiments, a parameter is provided to force scheduling of any remaining quantities (e.g., create new freight units for remainder parameter). In such an embodiment, if this parameter is set, an SFU is created for the remaining quantities at block 714. Then at block 716, the RFU quantity is reduced to zero. If at block 712 no SFU is created for remaining quantities or after reduction of RFU quantities is zero.

At block 720, the SFUs and are assigned to one or more vehicles. At block 714 SFUs that are from the same order and in a same vehicle are consolidated as a single SFU. Consolidation is particularly prevalent in embodiments that create freight units of minimum package size for optimization. In such embodiments, several package sized SFUs from an order may end up on the same vehicle. These would all be consolidated to a single larger SFU. In one embodiment, this would occur responsive to the setting of the consolidated planned freight units parameter being set.

Figure 7B:
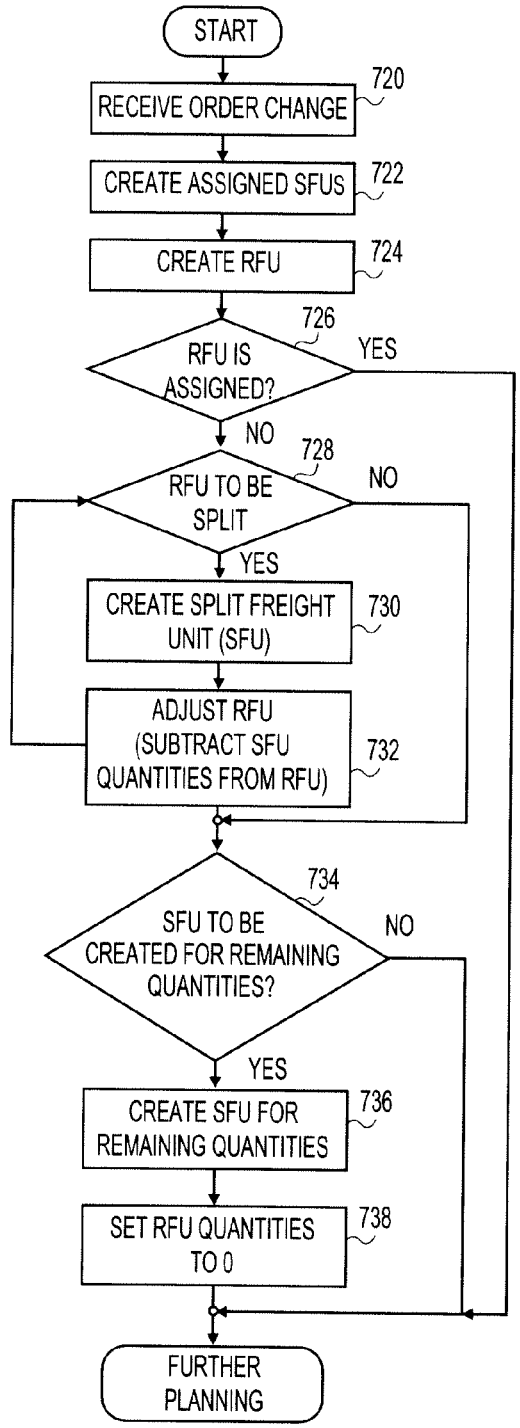

FIG. 7b is a flow diagram of order split in accordance with one embodiment of the invention. At block 720 an existing order is changed in OMS. As previously noted, this original order is not changed. At block 722 previously assigned SFUs are created, which were already created and assigned to vehicles in previous planning session (if any). This has the effect of removing quantities associated with the prior planned SFU, before engaging in further split of the new RFU. At block 724 RFU is created corresponding to total content of order minus quantities of previously assigned SFUs. A determination is made at decision block 726 if the RFU has previously been assigned to a vehicle, if so, no further split of the RFU occurs. In one embodiment, a check 728 is done whether RFU should be split. If yes, split freight unit (SFU) is created at block 730, with size either to be the minimum package size suitable for transportation, or capacity of means of transport, as stated above. At block 732 RFU is adjusted, in particular, quantities of SFU are substracted from RFU quantities. The check 728 and blocks 730, 732 are repeated until nofurther split of the RFU is desired. Blocks 734-738 are as described above for FIG. 7a, blocks 712-716.

In some embodiments, the SFUs and RFUs are not retained in persistent storage until planned for shipment. In one embodiment, SFUs and RFU are created automatically using a set of split rules. In an alternative embodiment, SFUs and RFUs may be created manually. In some embodiments, automatically created SFUs and RFUs may be manually overidden. Some embodiments provide great flexibility in manual application of split rules. In some embodiments, split freight units can be created, merged and deleted manually. In some embodiments, split rules to be applied may be manually selected. In some embodiments, manual intervention can prevent splits of particular orders.

Figure 8:
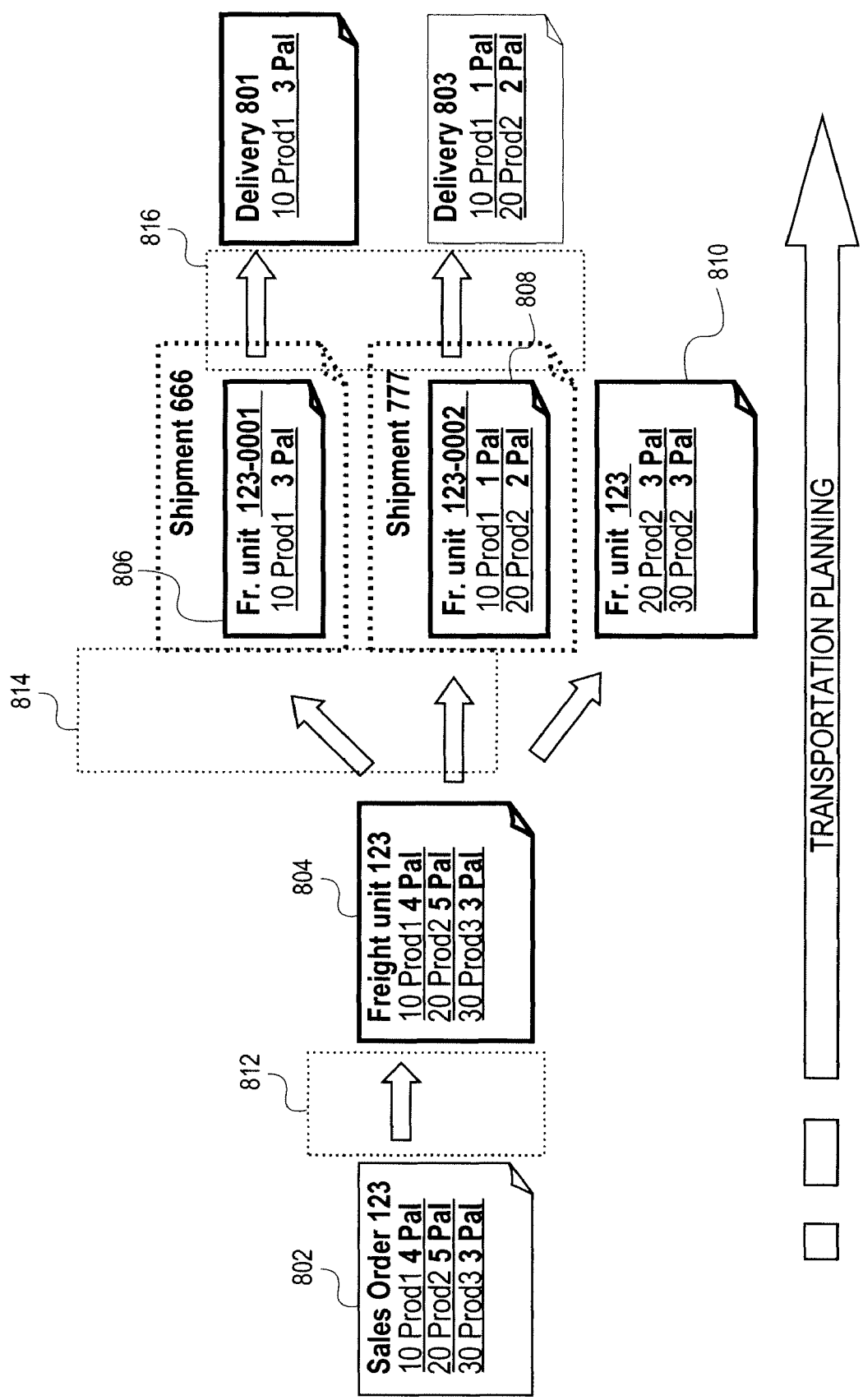
FIG. 8 is a schematic diagram of creation of deliveries using SFUs according to one embodiment of the invention.

FIG. 8 is a schematic diagram of creation of deliveries using SFUs according to one embodiment of the invention. Sales order 123 (document 802) is received at 812 an original FU is created out of the sales order 123 according to settings in the system. Typically, the original FU contains all document information necessary to plan and execute transportation of corresponding goods to the destination. Historically, FUs were limited to either the entire document, e.g., sales order or an entire line item of the document. Original FUs have not been permitted to combine multiple items (not all) or less than the total quantity of an item into the RFU. In this example, the original freight unit 804 is created on a freight unit per order basis.

At 814, split logic creates two split freight units 806 and 808 to become the basis for shipment 666 and 777 and a remainder freight unit 810. At this stage, neither the SFUs nor the RFU are retained as persistent storage. Because the RFU is not stored persistently, changes to order quantity can be made directly to the RFU with no impact on the transportation plan. This split is premised on two available vehicles with three pallet capacity and also assumes product split and consolidation are permitted. These issues are discussed more fully below with reference to FIG. 10. As represented in FIG. 7, the remainder freight unit 810 may be split further or adjusted directly based on subsequent order changes. Shipment 666 and shipment 777 are persisted to the database at 816 and become deliveries 801 and 803 respectively. In one embodiment, the deliveries 801, 803 include only the items and delivered quantity from the SFU. As shown, there is a one-to-one correspondence between planned SFUs and deliveries.

Figure 9:
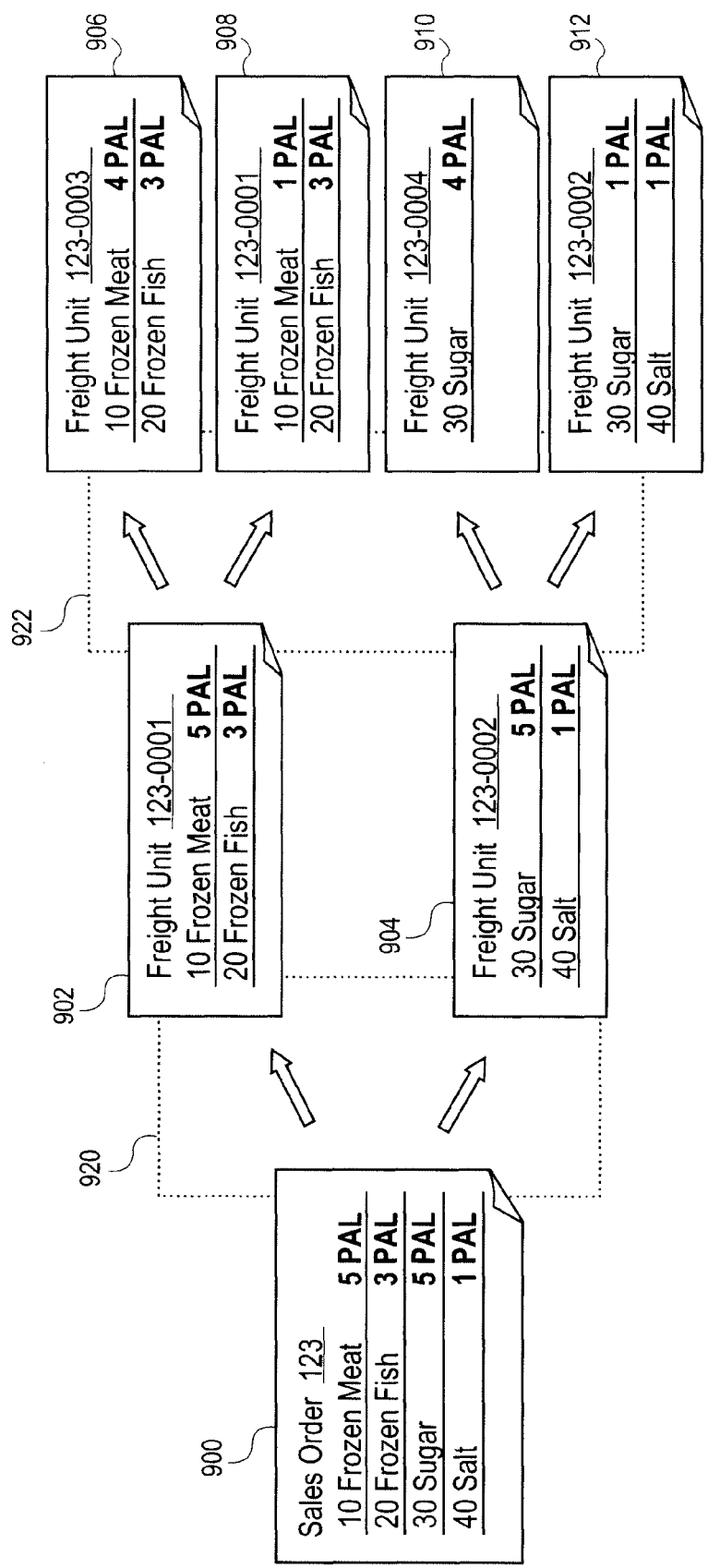
FIG. 9 is a schematic diagram of a second example of SFU transportation planning.

FIG. 9 shows a schematic diagram of a second example of SFU transportation planning. Received sales order 900 includes frozen and non-frozen goods. Compatibility logic 920 identifies that the order contains goods which are incompatible for concurrent shipment on a same vehicle. In this example, frozen foods and non-frozen foods are deemed incompatible for shipment. Thus, two original freight units 902 and 904 created one corresponding to all of the frozen goods and one corresponding to all of the non-frozen goods (i.e., the freight units are created based on compatibility rather than a per-order basis as in the previous example). From the two original FUs 902, 904, SFU 906 and SFU 910 respectively and an RFU 908, and RFU 912 respectively are created. The SFU 906, 910 may each become part of a (different) shipment which each in turn become a delivery as previously discussed. The RFUs may be further split and scheduled as appropriate.

Figure 10:
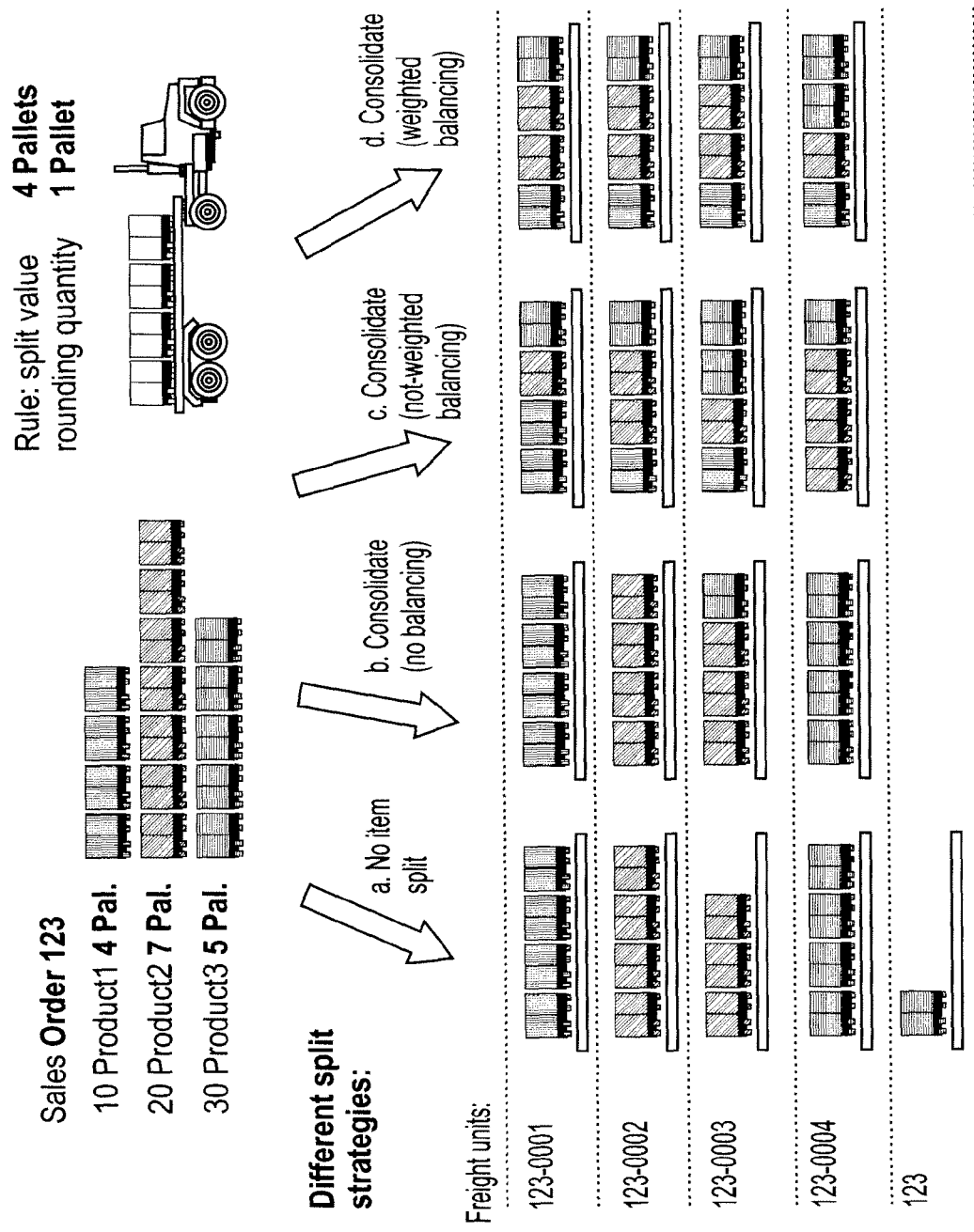
FIG. 10 is a schematic diagram of three different possible split scenarios according to one embodiment of the invention.

FIG. 10 is a schematic diagram of four different possible split scenarios according to one embodiment of the invention. The FU split number is shown as the four digit extension following 123. In this the figure, it is assumed that a truck holds up to four pallets and one pallet is the rounding quantity, e.g., no partial pallets are permitted on a truck. One strategy is not permitting items split. As discussed above, this precludes consolidation of different items for a sales order (less than all) onto a single vehicle. This results in some inefficiency as five trucks are required to carry sixteen pallets. Using a consolidate with no balancing strategy improves the inefficiency over a no split system, but may increase the risk of out of stock conditions where all transportation is not concurrent. Consolidate without weighted balancing mixes the products among deliveries, but may not result in the optimal delivery of goods as needed. Consolidate weighted balancing weights the delivery based on the number of user product ordered so that the higher demand items are likely to be delivered earlier in a transportation schedule. Some embodiments may always use one split strategy, other embodiments permit different split strategies to be applied on a characteristic combination basis, such as customer/location.

Figure 11:
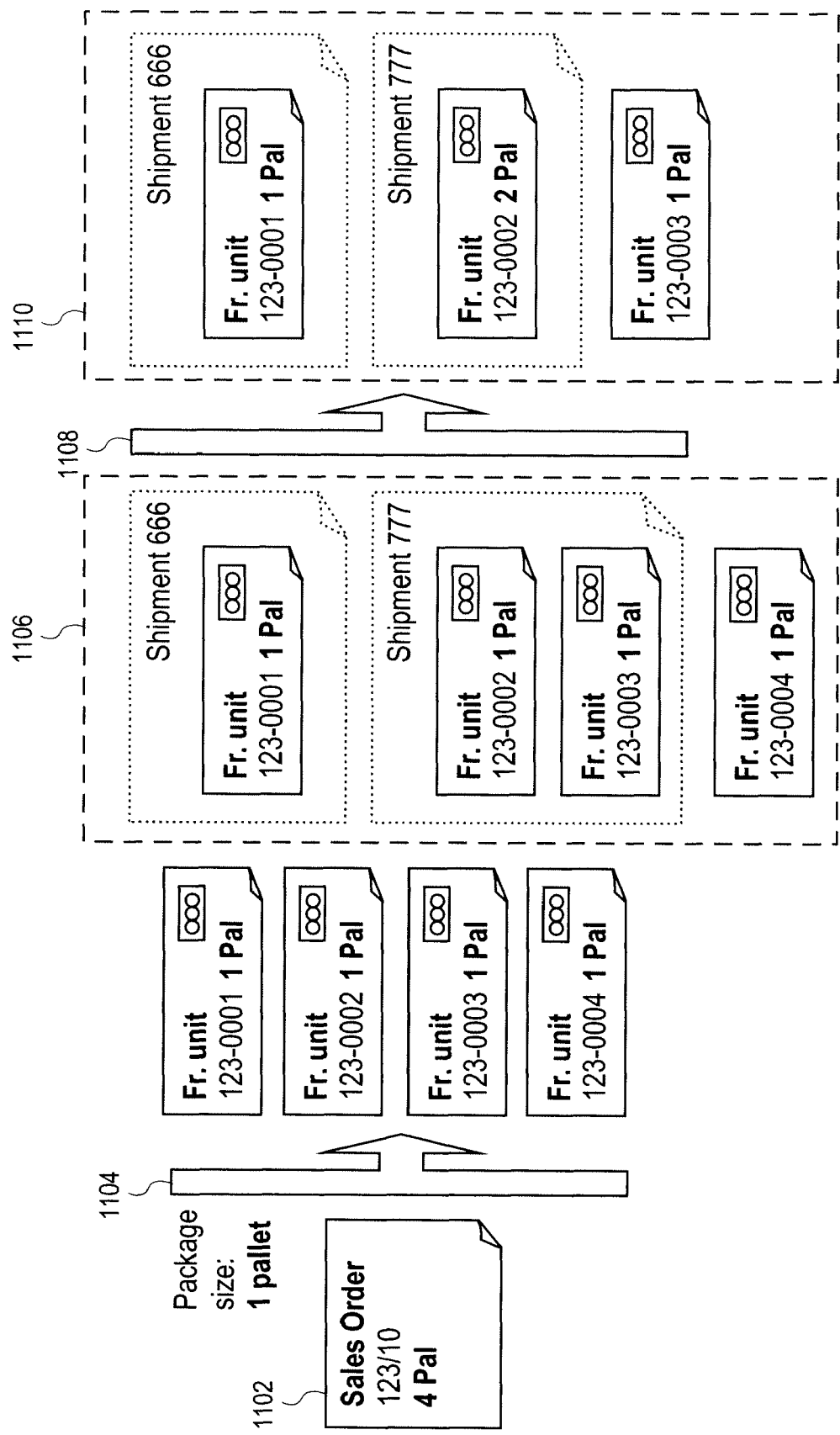
FIG. 11 is a schematic diagram of order split using optimization in one embodiment of the invention.

FIG. 11 is a schematic diagram of order split using optimization in one embodiment of the invention. A sales order 1102 for four pallets is received. At 1104, the sales order is decomposed to create split freight units in a size equal to a package size (smallest transportation quantity) that may be thought of as equal to the minimum rounding quantity for the product at issue. Some members of these package sized SFUs are scheduled by optimizer 1106. This example, one package size SFU is scheduled as shipment 666 and two package size SFUs are scheduled as shipment 777. The remaining freight unit is deemed the remainder freight unit in this context. Consolidation logic 1108 consolidates the two freight units in shipment 777 into a single freight unit of two pallets. Shipments 666 and 777 may be persisted deliveries formed as part of the transportation plan. The created deliveries are then sent to an execution system such as R/3 from SAP AG of Walldorf, Germany. The shipments are retained in the TPVS until processing in the execution system is complete.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards, or other type of machine-readable media suitable for storing electronic instructions.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A computer implemented method comprising:
    creating in a database a data structure for shipment documents corresponding to orders for goods, the database stored in a persistent memory module;
    receiving a first order for goods document;
    populating the data structure with a shipment document independent of, but corresponding to the first order for goods document at least in part by defining a shipment identifier and shipment activity data; and
    defining a link in the data structure to the first order for goods document, the operation of defining the link performed by a processor.

2. The method of claim 1 further comprising:
    replicating the shipment activity data to a scheduling engine.

3. The method of claim 1 herein defining shipment activity data comprises:
- defining a loading activity;
- defining a transport activity; and
- defining an unloading activity.

4. The method of claim 1 further comprising:
- receiving a second order for goods document; and
- adding additional activity data to the shipment document.

5. The method of claim 4 further comprising:
- accessing a scheduling service to schedule a shipment.

6. The method of claim 1 comprising:
- applying an optimizer to the shipment document to schedule a shipment.

7. A machine-readable medium containing instructions that when executed cause a machine to:
- create a database table for shipment documents corresponding to orders for goods;
- receive a first order for goods document;
- populate the database table with a shipment document independent of, but corresponding to the first order for goods document at least in part by defining a shipment identifier and shipment activity data; and
- define a link in the database table to the first order for goods document.

8. The machine-readable medium of claim 7, wherein instructions further cause the machine to:
- replicate the shipment activity data to a scheduling engine.

9. The machine-readable medium of claim 7, wherein the instructions cause the machine to define shipment activity data include instructions to cause the machine to:
- define a loading activity;
- define a transport activity; and
- define an unloading activity.

10. The machine-readable medium of claim 7, wherein instructions further cause the machine to:
- receive a second order for goods document; and
- add additional activity data to the shipment document.

11. The machine-readable medium of claim 10, wherein instructions further cause the machine to:
- access a scheduling service to schedule a shipment.

* * * * *

UNITED STATES PATENT AND TRADEMARK OFFICE
CERTIFICATE OF CORRECTION

PATENT NO. : 8,244,645 B2  
APPLICATION NO. : 11/212317  
DATED : August 14, 2012  
INVENTOR(S) : Konstantin N. Malitski Page 1 of 1

It is certified that error appears in the above-identified patent and that said Letters Patent is hereby corrected as shown below:

In the Claims, Column 11, Claim 3, line 1, please delete "herein" and insert --wherein--.

Signed and Sealed this  
Twelfth Day of March, 2013

Teresa Stanek Rea  
*Acting Director of the United States Patent and Trademark Office*